(12) United States Patent
Gabbay (10) Patent No.: US 6,473,362 B1
(45) Date of Patent: Oct. 29, 2002

(54) NARROWBAND BEAMFORMER USING NONLINEAR OSCILLATORS

(75) Inventor: Michael Gabbay, San Diego, CA (US)

(73) Assignee: Information System Laboratories, Inc., San Diego, CA (US)

( * ) Notice: Subject to any disclaimer, the term of this patent is extended or adjusted under 35 U.S.C. 154(b) by 0 days.

(21) Appl. No.: 09/846,592

(22) Filed: Apr. 30, 2001

(51) Int. Cl.[7] .................................................. H04B 1/02
(52) U.S. Cl. ...................................... 367/119; 367/905
(58) Field of Search ................................. 367/905, 103, 367/119, 138; 342/354, 368, 379; 73/626

(56) References Cited

U.S. PATENT DOCUMENTS

| | | |
|---|---|---|
| 3,857,092 A | 12/1974 | Meyer |
| 4,437,055 A | 3/1984 | Meyer |
| 5,339,284 A * | 8/1994 | Kaiser ...................... 367/905 |
| 5,999,131 A | 12/1999 | Sullivan |

\* cited by examiner

*Primary Examiner*—Daniel T. Pihulic
(74) *Attorney, Agent, or Firm*—Nydegger & Associates (57) ABSTRACT

A narrowband beamformer for extracting a mainbeam having a frequency, $\Omega$, that is received at a beamsteered sensor array includes a plurality of nonlinear oscillators. Each nonlinear oscillator operates on a signal from one of the beamsteered sensors to produce a nonlinear oscillator output. A summer receives and sums all of the nonlinear oscillator outputs. Each nonlinear oscillator is coupled to at least one other nonlinear oscillator to create a signal in the summer output having a frequency of approximately, $\Omega$, in response to receipt of the mainbeam signal by the sensor array. Further, the nonlinear oscillators are coupled to create a spectrum of signals in the summer output that are centered around a frequency, $\omega$, in response to receipt of a directional interference signal by the sensor array. A matched filter is used to isolate the frequency, $\Omega$, to thus extract the mainbeam from the directional interference.

18 Claims, 4 Drawing Sheets

$\Delta\varphi = 0.5$ ($\theta = 9.2° < \theta_{null} = 14.5°$ for $d = \lambda/2$)

Fig. 8

NARROWBAND BEAMFORMER USING NONLINEAR OSCILLATORS

FIELD OF THE INVENTION

The present invention pertains generally to beamformers. More particularly, the present invention pertains to narrowband beamformers. The present invention is particularly, but not exclusively, useful as a narrowband beamformer for sonar and radiofrequency applications.

BACKGROUND OF THE INVENTION

A beamformer is a spatial filter that operates on an array of sensors to enhance the amplitude of a coherent wavefront relative to background noise and directional interference. One type of beamformer, the narrowband beamformer, is used to increase resolution in a given direction (mainbeam direction) over a narrow frequency range, and suppress sidelobe signals within the narrow frequency range (directional interference).

Figures 1, 2:
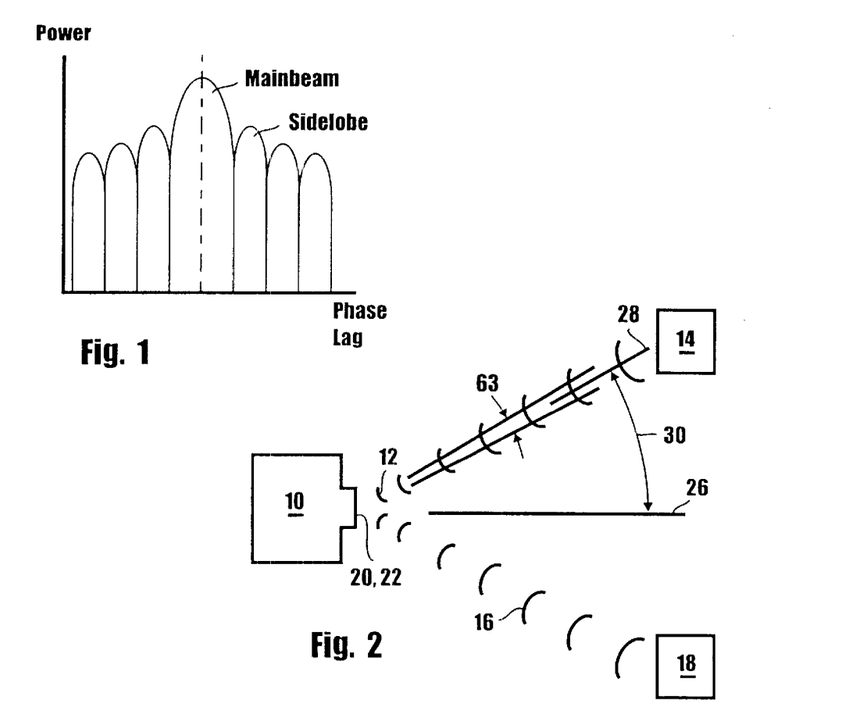
FIG. 1 is a graph showing the relationship between phase angle and power obtained with a typical beamformer that uses conventional linear components.
FIG. 2 is a general overview of the environment in which the beamformer of the present invention operates.

Conventional narrowband beamformers use essentially linear components and suffer from several drawbacks. To explore these drawbacks, consider the operation of a conventional narrowband beamformer. Generally, in conventional narrowband beamformers, delays are provided to beamsteer each sensor in the direction of the mainbeam. Once the sensor array is beamsteered, a signal travelling along the mainbeam path will create a plurality of sensor outputs that are all substantially in-phase. In contrast, sidelobe signals will create a plurality of sensor outputs that are out-of-phase. Conventional narrowband beamformers then separate the in-phase signals from the out-of-phase signals to isolate the mainbeam. Specifically, conventional narrowband beamformers integrate the sensor output signals to obtain the signal power as a function of phase lag. FIG. 1 shows a graph of signal power as a function of phase lag for a conventional narrowband beamformer, showing the mainbeam and sidelobes. Unfortunately, for high mainbeam resolution, lengthy signal processing times are often required to integrate the sensor outputs.

Because the use of phase lag to discriminate between mainbeam and sidelobe signals often provides insufficient resolution, several data processing techniques have been developed to increase resolution including 1) Eigenvector Techniques, 2) a Constant Modulus Algorithm, or 3) Least Squares Techniques. Unfortunately, these techniques share a common shortcoming in that strong, highly correlated multipath components introduce a positive bias that a conventional narrowband beamformer is unable to correct. Alternatively, increased resolution can be obtained by increasing the spacing between sensor elements. However, increased space is not always available, and for systems that are prepared to utilize existing sensor arrays, retrofitting the arrays to increase sensor spacing can be costly.

In light of the above, it is an object of the present invention to provide devices suitable for the purposes of beamforming the output of an array of sensors to increase mainbeam resolution and suppress sidelobe signals. It is another object of the present invention to provide a narrowband beamformer capable of sidelobe suppression in a high clutter environment. It is yet another object of the present invention to provide a receiver that incorporates a narrowband beamformer for the purpose of reducing the distance required between sensors in the sensor array. Yet another object of the present invention is to provide a narrowband beamformer which is easy to use, relatively simple to manufacture, and comparatively cost effective.

SUMMARY OF THE PREFERRED EMBODIMENTS

The present invention is directed to a receiver for receiving a mainbeam signal of approximate frequency, $\Omega$, in an environment containing directional interference signals that also have an approximate frequency, $\Omega$. For the present invention, the receiver includes a sensor array having a plurality of sensors. Each sensor in the array preferably has a linear response. A plurality of individual adjustable delays are respectively connected to the sensor array to beamsteer the sensor array in the direction of the mainbeam. Specifically, a separate delay is connected to each sensor in the sensor array. As such, a delay output that includes all of the signals exiting the plurality of delays is established. With this cooperation of structure, a mainbeam signal that is received by the sensor array will be processed through the delays to create a plurality of signals in the delay output that are all substantially in-phase. Further, with this cooperation of structure, a sidelobe signal (i.e. a signal caused by directional interference) that reaches the sensor array will be processed through the delays to create a plurality of signals in the delay output that are substantially out-of-phase. It is to be appreciated that the spacing and configuration of the sensor array will dictate the magnitude of each time delay required to beamsteer the sensor array in the direction of the mainbeam signal.

It is an important aspect of the present invention that the receiver includes a beamformer having a plurality of nonlinear oscillators, a summer and a matched filter. For the present invention, each nonlinear oscillator is connected to a separate delay to thereby interpose each delay between one sensor and one nonlinear oscillator. Accordingly, a plurality of branches is established with each branch containing, in sequence, a sensor, a delay and a nonlinear oscillator. Within each branch, the nonlinear oscillator operates on signals received from a delay to produce a nonlinear oscillator output.

A summer is connected to each of the nonlinear oscillators to receive and sum the output from each nonlinear oscillator. This creates a summer output. The matched filter is connected to the summer to receive the summer output and extract signals from the summer output having a predetermined frequency.

Another important aspect of the present invention is that each nonlinear oscillator is coupled to at least one other nonlinear oscillator. As such, the oscillation state of each nonlinear oscillator depends on the oscillation state of at least one other nonlinear oscillator. This combination of coupled nonlinear oscillators is hereinafter referred to as the coupled oscillator array. For the present invention, the nonlinear oscillators are coupled to each other to create a signal in the summer output having a frequency of approximately, $\Omega$, in response to a mainbeam signal being received by the beamsteered sensor array. Further, when coupled in this manner, the nonlinear oscillators create a spectrum of signals in the summer output that is centered about a frequency of approximately, $\overline{\omega}$, in response to a sidelobe signal being received by the sensor array. The frequency, $\overline{\omega}$, corresponds to the average of the natural frequencies for all of the nonlinear oscillators.

In operation, the sensors are first beamsteered in the direction of the mainbeam by adjusting the delays. Next, a critical phase lag, $\Delta\phi_C$ is selected. As explained further below, the size of the critical phase lag, $\Delta\phi_C$ will determine the width of the mainbeam that is extracted by the beamformer. Once the critical phase lag, $\Delta\phi_C$ is selected, the coupling strength between the coupled nonlinear oscillators is adjusted to configure the coupled oscillator array to have the following two characteristics. First, the coupled oscillator array is configured to synchronize in response to signals in the delay output that are in-phase. More specifically, the coupled oscillator array is configured to synchronize for signals in the delay output having a phase lag that is less than the selected critical phase lag, $\Delta\phi_C$. Second, the coupled oscillator array is configured to de-synchronize for signals in the delay output that are out-of-phase (i.e. signals in the delay output having a phase lag exceeding the critical phase lag, $\Delta\phi_C$).

With the coupling strength between the coupled nonlinear oscillators adjusted to configure the coupled oscillator array as described above, the matched filter can be used to extract the mainbeam from the sidelobe beams. Specifically, as described above, receipt of a mainbeam having an approximate frequency, $\Omega$, by the sensor array will create a plurality of in-phase signals of approximate frequency, $\Omega$, in the delay output. Because the phase lag, $\Delta\phi$, between these signals will be less than the critical phase lag, $\Delta\phi_C$, these signals will cause the coupled oscillator array to synchronize and create a signal having approximate frequency, $\Omega$, in each of the nonlinear oscillator outputs. These signals created in the nonlinear oscillator outputs will be in-phase and have approximate frequency, $\Omega$. Since the signals in the nonlinear oscillator outputs are in-phase, the effect of the summer will be to create a signal in the summer output having approximate frequency, $\Omega$.

Additionally, as described above, receipt of a sidelobe signal having an approximate frequency, $\Omega$, by the sensor array will create a plurality of out-of-phase signals having an approximate frequency, $\Omega$, in the delay output. Because the phase lag, $\Delta\phi$, between these signals will exceed the critical phase lag, $\Delta\phi_C$, these signals will not cause the coupled oscillator array to synchronize. Rather, out-of-phase signals in the delay output will cause the coupled oscillator array to produce signals in the nonlinear oscillator outputs that are out-of-phase. Since the signals in the nonlinear oscillator outputs are out-of-phase, the effect of the summer will be to create a spectrum of signals centered on the frequency, $\bar{\omega}$, in the summer output.

It is to be appreciated that the receiver will simultaneously process both mainbeam and sidelobe signals. Specifically, the mainbeam will be processed as described above producing a signal in the summer output having a frequency, $\Omega$, while the sidebeam will be processed to produce a spectrum of signals in the summer output centered on the frequency, $\bar{\omega}$. Accordingly, the matched filter can be used to isolate the frequency, $\Omega$, to thus extract the mainbeam from the sidelobe.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Referring initially to FIG. 2, a receiver in accordance with the present invention is shown positioned in a typical signal environment and designated 10. As shown in FIG. 2, the environment in which the receiver 10 operates generally includes a mainbeam signal 12 having an approximate frequency, $\Omega$, that is generated by a mainbeam source 14. Also shown, the environment contains directional interference signals 16 from source 18 that also have an approximate frequency, $\Omega$. To receive the signals 12, 16, the receiver 10 includes a sensor array 20.

Figure 3:
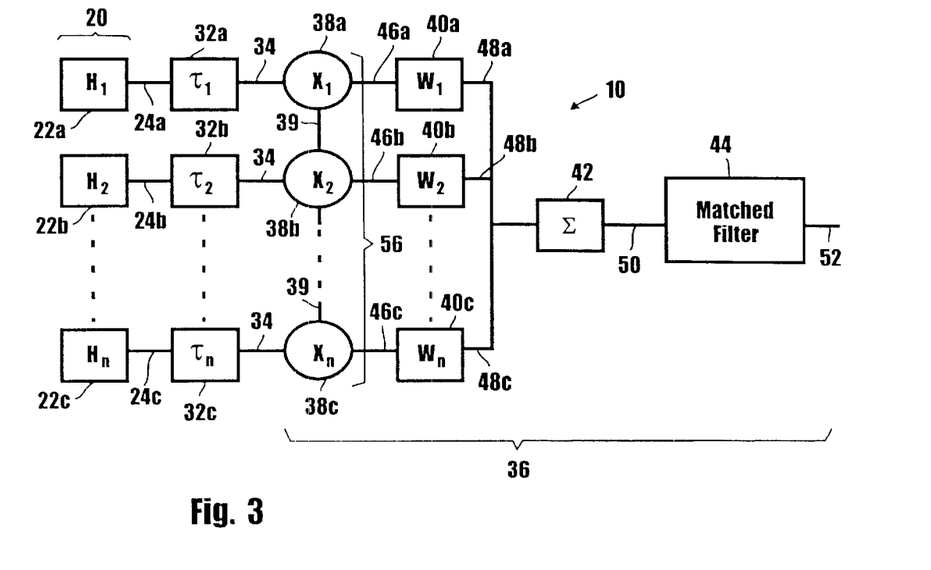
FIG. 3 is a schematic layout of a receiver in accordance with the present invention showing the beamformer and the interaction of the beamformer with the other components of the receiver.

Referring now to FIG. 3, it can be seen that the sensor array 20 includes a plurality of sensors 22 that are designated $H_{1,2...N}$. For the present invention, the sensors 22 can be hydrophones, radiofrequency (rf) antennas or any other sensor known in the pertinent art capable of receiving a signal from an environment such as that shown in FIG. 2. Further, the sensors 22 can be arranged in any suitable manner known in the pertinent art such as a linear array or a planar array. Although three sensors 22 are shown in FIG. 3, it is to be appreciated that any number of sensors can be used in accordance with the present invention. Preferably, each sensor 22 is a linear response type sensor, and as such, upon receiving signals 12, 16, a plurality of sensor output signals 24a–c are created that have a linear relationship to the received signals 12, 16.

Referring back to FIG. 2, the sensor array 20 as shown, is physically oriented in the direction of line 26. Further, as shown, the mainbeam signal 12 propagates from the mainbeam source 14 to the receiver 10 substantially along a line 28 that is located at an angle 30 from line 26. Thus, it is to be appreciated that for an arbitrarily located mainbeam source 14, the mainbeam signals 12 reach the sensor array 20 at a nonzero angle of incidence, and as such, a phase lag will be created between sensors 22 for each mainbeam signal 12 received at the sensor array 20.

As further shown in FIG. 3, adjustable delays 32a–c are provided to beamsteer the sensor array 20 in the direction of the mainbeam signal 12 (for the present disclosure, the magnitude of each delay 32 is designated $\tau_{1,2...N}$). For example, as shown, delay 32a is connected to sensor 22a to receive sensor output signals 24a from the sensor 22a. The delays 32a–c then create a delay output 34 that includes all of the signals exiting all of the delays 32. With this cooperation of structure, a mainbeam signal 12 that is received by the sensor array 20 will be processed through the delays 32 to create a plurality of signals in the delay output 34 that are substantially in-phase. Further, with this cooperation of structure, a directional interference signal 16 that reaches the sensor array 20 will be processed through the delays 32 to create a plurality of signals in the delay output 34 that are substantially out-of-phase. It is to be appreciated that the geometry of the sensor array 20 will dictate the magnitude of each time delay 32a–c required to beamsteer the sensor array 20 in the direction of the mainbeam signal 12.

Importantly, the receiver 10 includes a beamformer 36 having a plurality of nonlinear oscillators 38a–c, a plurality of coupling circuits 39, a plurality of weighting circuits 40a–c, a summer 42 and a matched filter 44. In FIG. 3, the state vector x of each nonlinear oscillator 38 is designated $x_{1,2\ldots N}$, and the weight applied by each weighting circuit 40 is designated $W_{1,2\ldots N}$. Also in FIG. 3, it can be seen that for the present invention, each nonlinear oscillator 38 is connected to a delay 32 to thereby interpose each delay 32 between a sensor 22 and a nonlinear oscillator 38. Accordingly, as shown, a plurality of N branches is established with each branch containing a sensor 22, a delay 32, a nonlinear oscillator 38 and a weighting circuit 40. For example, the $N^{th}$ branch contains sensor 22c, delay 32c, nonlinear oscillator 38c and weighting circuit 40c. Within each branch, the nonlinear oscillator 38 operates on signals received from the delay 32 to produce a nonlinear oscillator output 46. For example, for the $N^{th}$ branch shown in FIG. 3, the nonlinear oscillator 38c operates on signals in the delay output 34 from delay 32c to produce a nonlinear oscillator output 46c. An optional weighting circuit 40 in each branch operates on the nonlinear oscillator output 46 to produce a weighed output 48. For example, for the $N^{th}$ branch shown in FIG. 3, the weighting circuit 40c operates on the nonlinear oscillator output $46^c$ to produce weighted output 48c.

As shown, a summer 42 is connected to each of the weighting circuits 40 to receive and sum the weighted outputs 48 from each of the weighting circuits 40, thus creating a summer output 50. For example, the nonlinear oscillator outputs 46 may be weighted and summed according to the following equation:

$$s(t) = \Sigma w_i g(x_i)$$

where $w_i$ is the weight of the $i^{th}$ weighting circuit 40, $x_i$ is the state vector of the $i^{th}$ nonlinear oscillator 38 and $g(x_i)$ is a linear combination of the components of the state vector $x_i$. As such, the optional weighting circuits 40 can be used to taper the sensor array 20 if desired. As further shown, a matched filter 44 is connected to the summer 42 to operate on the signal s(t) created in the summer output 50 to thereby create a matched filter output 52 that includes only signals of a predetermined frequency. When weighting circuits 40 are not used, the nonlinear oscillator outputs 46a–c are summed directly by the summer 42.

In the preferred embodiment of the present invention, each nonlinear oscillator 38 is coupled to at least one other nonlinear oscillator 38 by a coupling circuit 39. As such, the state vector, $x_i$, of the $i^{th}$ nonlinear oscillator 38 is made to depend on the state vector, x, of at least one other nonlinear oscillator 38. For example, the dynamics of each nonlinear oscillator 38 may be governed by the system of nonlinear ordinary differential equations of the form:

$$dx_i/dt = F(x_i) + \kappa(x_{i+1} + x_{i-1} - 2x_i)$$

where $F(x_i)$ is a nonlinear function of $x_i$ and $\kappa$ is the coupling strength. In this example, each nonlinear oscillator 38 is coupled to each nearest nonlinear oscillator 38, but it is to be appreciated that other coupling schemes wherein the nonlinear oscillators 38 are coupled to nonadjacent nonlinear oscillators 38 may be suitable for certain applications.

As shown in FIG. 3, the combination of coupled nonlinear oscillators 38a–c constitutes a coupled oscillator array 56. Preferably, the coupled, oscillator array 56 is implemented on compact, low cost, low power, analog VLSI chips. For operation at high radio-frequencies, the coupled oscillator array 56 may be implemented using microwave oscillators. For the present invention, the nonlinear oscillators 38 are coupled to each other to create a signal in the summer output 50 having a frequency of approximately, $\Omega$, in response to a mainbeam signal 12 being received by the sensor array 20. Further, when coupled in this manner, the nonlinear oscillators 38 create a spectrum of signals in the summer output 50 centered about a frequency of approximately, $\bar{\omega}$, in response to a directional interference signal 16 being received by the sensor array 20. The frequency, $\bar{\omega}$, corresponds to the average of the natural frequencies for all of the nonlinear oscillators 38.

Figure 4:
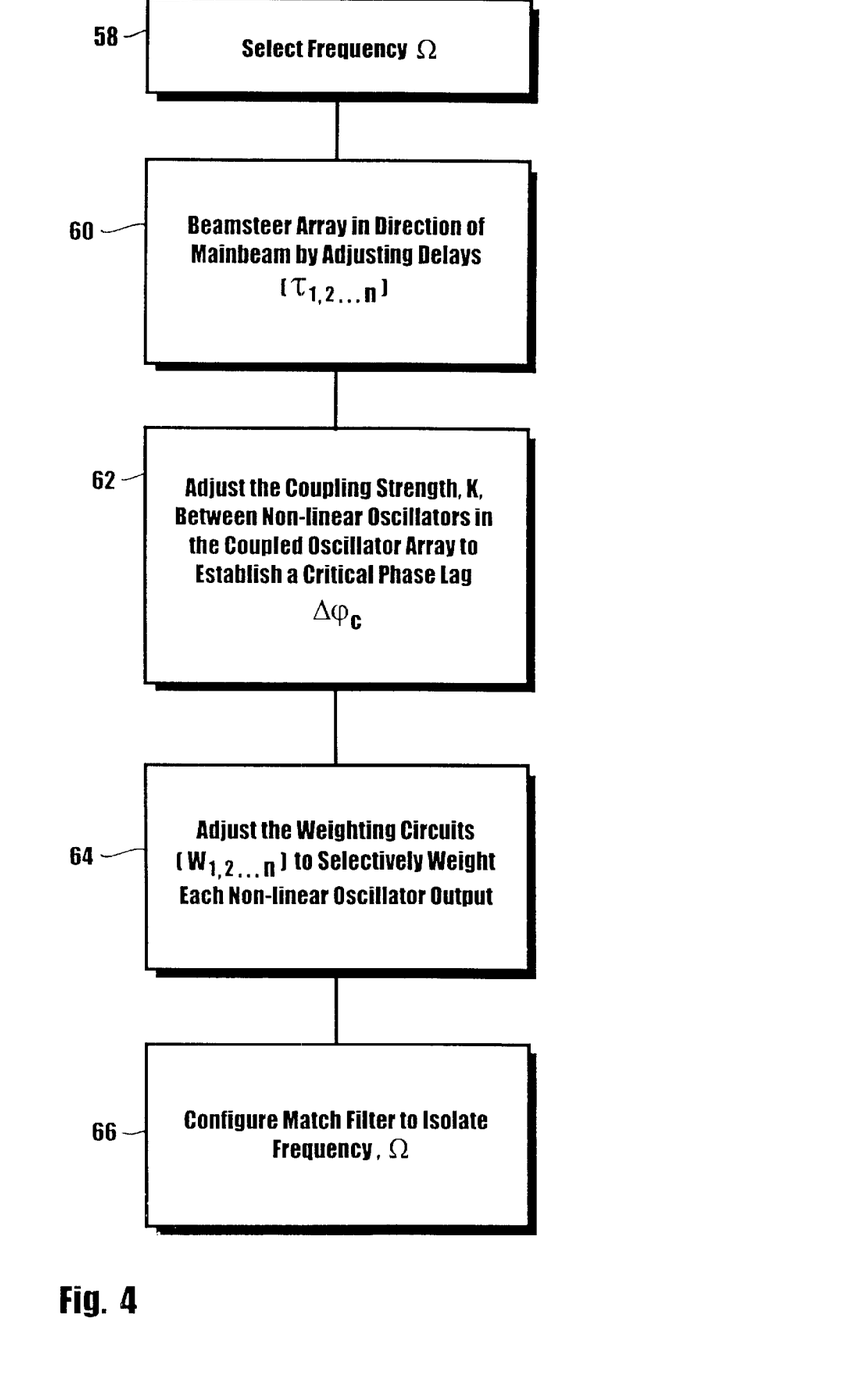
FIG. 4 is a functional block diagram setting forth the sequential steps performed during operation of a receiver in accordance with the present invention.

Referring now to FIG. 4, the receiver 10 for the present invention can be setup for operation by first selecting the frequency, $\Omega$, for the mainbeam signal 12 of interest (block 58). Next, the sensors 22 are beamsteered in the direction of the mainbeam signal 12 by adjusting the magnitudes $\tau_{1,2\ldots N}$ of the delays 32 (block 60). Additionally, the coupling strength, $\kappa$, between nonlinear oscillators 38 in the coupled oscillator array 56 is adjusted to establish a critical phase lag, $\Delta\phi_C$ (block 62). For the present invention, the size of the critical phase lag, $\Delta\phi_C$ will determine the width 63 of the mainbeam signal 12 (shown in FIG. 2) that is extracted by the beamformer 36. Further, the receiver 10 setup includes adjusting the optional weighing circuits 40 to selectively weight each nonlinear oscillator output 48 (block 64). Finally, the matched filter 44 is configured to isolate the frequency, $\Omega$ (block 66).

Once the receiver 10 is properly setup following the flowchart in FIG. 4, the mainbeam signal 12 can be processed through the components of the receiver 10 (shown in FIG. 3). Specifically, the coupling relationship between the nonlinear oscillators 38 is established by the correct design of the coupling circuits 39 to configure the coupled oscillator array 56 to have the following two characteristics. First, the coupled oscillator array 56 is configured to synchronize in response to signals in the delay output 34 that are in-phase. More specifically, the coupled oscillator array 56 is configured to synchronize for signals in the delay output 34 having a phase lag that is less than the selected critical phase lag, $\Delta\phi_C$. Second, the coupled oscillator array 56 is configured to de-synchronize for signals in the delay output 34 that are out-of-phase (i.e. signals in the delay output 34 having a phase lag exceeding the critical phase lag, $\Delta\phi_C$).

With the coupling strength, $\kappa$, between the coupled nonlinear oscillators 38 adjusted to configure the coupled oscillator array 56 as described above, the matched filter 44 can be used to extract the mainbeam signal 12 from the directional interference signals 16. Specifically, as described above, receipt of a mainbeam signal 12 having an approximate frequency, $\kappa$, by the sensor array 20 will create a plurality of in-phase signals of approximate frequency, $\Omega$, in the delay output 34. Because the phase lag, $\Delta\phi$, between these signals will be less than the critical phase lag, $\Delta\phi^C$, these signals will cause the coupled oscillator array 56 to synchronize and create a signal having approximate frequency, $\Omega$, in each of the nonlinear oscillator outputs 46. The weighting circuits 40a–c will not alter the frequency, $\Omega$, or phase of the nonlinear oscillator outputs 46, thus the weighted outputs 48 will be in-phase and have approximate frequency, $\Omega$. Since the signals in the weighted outputs 48 are in-phase, the effect of the summer 42 will be to create a signal in the summer output 50 having approximate frequency, $\Omega$.

Additionally, as described above, receipt of a directional interference signal 16 having an approximate frequency, Ω, by the sensor array 20 will create a plurality of out-of-phase signals having an approximate frequency, Ω, in the delay output 34. Because the phase lag, Δφ, between these signals in the delay output 34 will exceed the critical phase lag, $\Delta\phi^C$, these signals will not cause the coupled oscillator array 56 to synchronize. Rather, out-of-phase signals in the delay output 34 will cause the coupled oscillator array 56 to produce signals in the nonlinear oscillator outputs 46a–c that are out-of-phase. As mentioned above, the weighting circuits 40a–c will not alter the frequency, Ω, or phase of the nonlinear oscillator outputs 46. Thus signals will be created in the weighted outputs 48 that are out-of-phase, and the effect of the summer 42 will be to create a spectrum of signals centered on the frequency, $\overline{\omega}$, in the summer output 50.

Figure 5:
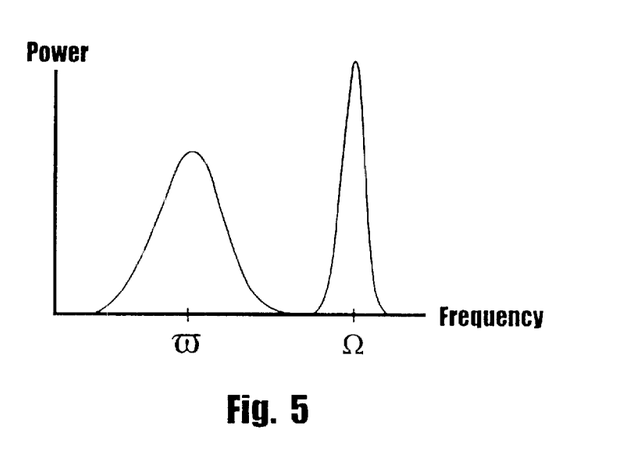
FIG. 5 is a graph showing the relationship between frequency and power obtained with a beamformer in accordance with the present invention.

It is to be appreciated that the receiver 10 will simultaneously process both the mainbeam signal 12 and directional interference signals 16. Specifically, the mainbeam signal 12 will be processed as described above producing a signal in the summer output 50 having a frequency, Ω, while the directional interference signals 16 will be processed to produce a spectrum of signals in the summer output 50 centered on the frequency, $\overline{\omega}$. Thus, a power spectrum such as the power spectrum shown in FIG. 5 is obtained in the summer output 50. Accordingly, the matched filter 44 can be used to isolate the frequency, Ω, to limit the matched filter output 52 to the mainbeam signal 12. Note that if it is found to be necessary or advantageous for the natural frequencies, ω, of the nonlinear oscillators 38 to be much higher than the frequency, Ω, of the mainbeam signal 12, the signal s(t) in the summer output 50 can be demodulated before being sent to the matched filter 44. (i.e., the nonlinear oscillators 38 in this case are acting as carrier signals which are modulated by the mainbeam signal 12).

EXAMPLE

Computational validation of the nonlinear oscillator beamformer concept has been conducted using MATLAB simulations. A system of N nonlinear oscillators with nearest-neighbor coupling was simulated. The dynamics obeyed by each oscillator were chosen to be that of a forced, weakly nonlinear Van der Pol oscillator:

$$dz_i/dt=(\alpha+i\overline{\omega})z_i-|z_i|^2z_i+\kappa(z_{i+1}+z_{i-1}-2z_i)+fe^{i(\Omega t+\phi_i)}, i=2,\ldots,N-1$$

where $z_i$ is a complex quantity describing the state of the $i^{th}$ oscillator, α is the excitation coefficient, κ is the coupling coefficient, $f$, Ω, and $\phi_i$ are the input signal amplitude, frequency, and phase, respectively. The first (i=1) and last (i=N) elements obeyed the equations:

$$dz_1/dt=(\alpha+i\overline{\omega})z_1-|z_1|^2z_1+\kappa(z_2-z_1)+fe^{i(\Omega t+\phi_1)},$$

and $$dz_N/dt=(\alpha+i\overline{\omega})z_N-|z_N|^2z_N+\kappa(z_{N-1}-z_N)+fe^{i(\Omega t+\phi_N)},$$

respectively. Note that these equations are dimensionless but can be put into dimensional form with appropriate scaling.

Each oscillator had a separate input corresponding to the input coming from its respective sensor via its delay. The variation of the angle of incidence, θ of an incoming plane wave was modeled by appropriate selection of the phase lag, $\Delta\phi=\phi_{i+1}-\phi_i$, between inputs at adjacent oscillators using the formula Δφ=kd sin θ, where k is the wavenumber of the incoming plane wave and d is the spacing between sensor elements. For the following results, the delays have been set to zero so that the array is steered to broadside.

Figure 6:
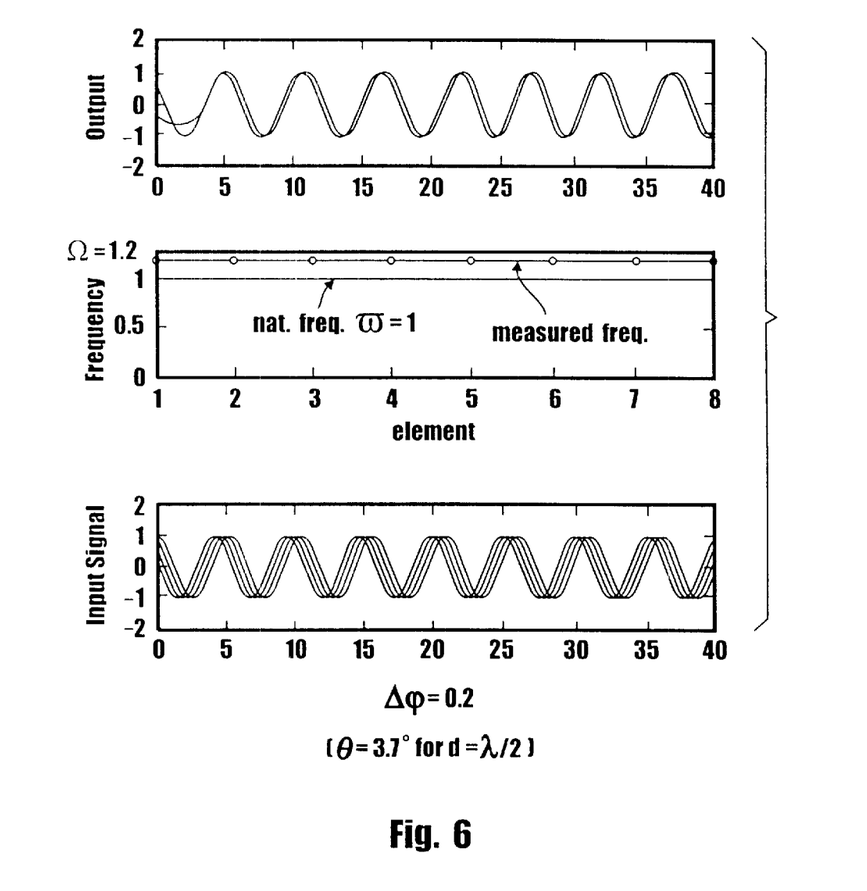
FIG. 6 is a series of graphs showing the beamformer output for a mainbeam signal computed for a coupled oscillator array having eight nonlinear oscillators.
Figure 7:
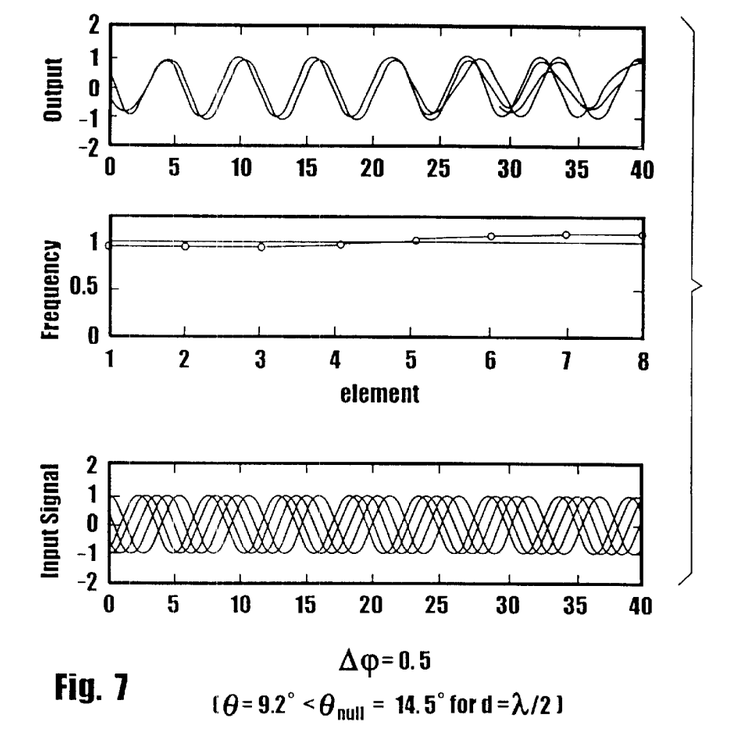
FIG. 7 is a series of graphs showing the beamformer output for a sidelobe signal computed for a coupled oscillator array having eight nonlinear oscillators.

FIGS. 6 and 7 show the simulation results for a beamformer with eight elements. In FIG. 6 the incoming plane wave is incident just off the beam axis. The phase difference is Δφ=0.2 radians which corresponds to an angle of incidence of θ=3.7° for half-wavelength spacing between elements. The input signals, as a function of time, to each of the eight oscillators are shown in the bottom panel and the phase difference between inputs can be seen in the offset of the curves. The frequency of the input signal was Ω=1.2. The output of each of the oscillators (taking the real part of $z_i$) is shown in the top panel. The oscillators start out with random initial conditions but they quickly synchronize and maintain this synchronization as can be seen by the constant phase difference between curves. Note that this phase difference is less than for the input signals which enables the mainbeam of the nonlinear beamformer to have a flatter response than the equivalent linear beamformer (see FIG. 8). The middle panel shows the natural frequencies (x's) of the oscillators, chosen to be $\overline{\omega}$=1.0 for all, and the measured frequencies (circles) from the simulation. It can be seen that all the elements have measured oscillation frequencies of 1.2, equal to that of the incident plane wave input. Therefore, the power spectrum of the summed output will be sharply centered on the input frequency. Accordingly, this signal would be classified as being in the mainbeam of the nonlinear oscillator beamformer.

FIG. 7 shows the beamformer dynamics in response to a signal that lies in the sidelobe of the nonlinear oscillator beamformer, but would be in the mainbeam of the equivalent linear beamformer. The phase difference between the inputs to adjacent oscillators is Δφ=0.5 corresponding to an angle of incidence of θ=9.2° assuming half-wavelength spacing. All other parameters are the same as in FIG. 6. The input signals shown in the bottom panel have a wider spacing between them than in FIG. 6 due to the larger input phase difference. The top panel shows the oscillator outputs which, as can clearly be seen, do not remain synchronized—the phase difference between outputs changes with time. The measured frequencies (circles) are centered around the natural frequencies (x's) of $\overline{\omega}$=1.0 rather than being all equal to the input frequency of Ω=1.2 as was the case in FIG. 6. Therefore, the power spectrum of the summed output will be distributed around the natural frequency. Accordingly, this signal would be classified as being outside the mainbeam of the nonlinear oscillator beamformer. Note that the angle of incidence of θ=9.2° is within the mainbeam of the equivalent, untapered, eight-element linear beamformer whose first null is located at 14.5°. This indicates the improved resolution possible with the nonlinear oscillator beamformer.

Figure 8:
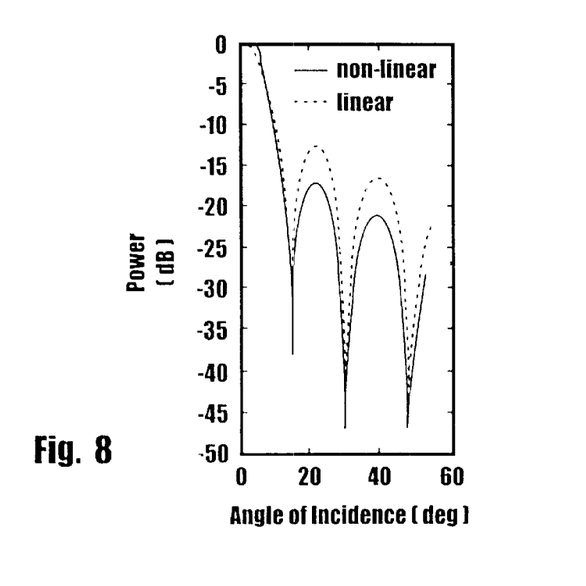
FIG. 8 is a graph showing the beam pattern corresponding to the response of the nonlinear oscillator beamformer to a given amplitude plane wave signal as the angle of incidence of the signal is varied.

FIG. 8 shows the beam pattern corresponding to the response of the nonlinear oscillator beamformer (solid line) to a given amplitude plane wave signal as the angle of incidence (assuming half-wavelength spacing between elements) is varied. The array is steered to broadside. Also shown is the beam pattern which would be produced by the equivalent, untapered, conventional linear beamformer (dashed line). The response is found from the output power spectrum at a given angle of incidence by calculating the power contained in a small interval around the input frequency Ω. The plotted beam patterns are normalized so that the response at θ=0° is equal to one (0 dB on the plot). It can be seen that the nonlinear oscillator beamformer possesses a narrower and flatter mainbeam and lower sidelobe levels than does the conventional beamformer. The critical angle of incidence, above which the coupled oscillator array will not synchronize, can be identified by the sharp corner on the mainbeam of the nonlinear oscillator beam pattern. It is approximately 5° which corresponds to a critical phase difference of $\Delta\phi_C$=0.27 radians.

While the particular Narrowband Beamformer Using Nonlinear Oscillators as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A receiver for receiving a mainbeam signal of approximate frequency, $\Omega$, in an environment containing directional interference signals of approximate frequency, $\Omega$, said receiver comprising:
   a sensor array having a plurality of sensors;
   a means for beamsteering said sensor array in the direction of the mainbeam;
   a plurality of nonlinear oscillators, each said nonlinear oscillator connected to a said sensor to produce a nonlinear oscillator output;
   a summer connected to each said nonlinear oscillator for receiving and summing said nonlinear oscillator outputs and creating a summer output;
   at least one coupling circuit for coupling each said nonlinear oscillator to at least one other said nonlinear oscillator to cause a summer output having a frequency of approximately, $\Omega$, in response to receipt of the mainbeam signal by the sensor array and to cause a summer output having a frequency of approximately, $\bar{\omega}$, in response to receipt of a directional interference signal by the sensor array; and
   a matched filter connected to said summer for receiving said summer output and separating said summer output into signals having an approximate frequency of $\Omega$ and signals having an approximate frequency of $\bar{\omega}$.

2. A receiver as recited in claim 1 wherein said sensors are radiofrequency antennas.

3. A receiver as recited in claim 1 wherein said sensors are hydrophones.

4. A receiver as recited in claim 1 wherein said sensor array is a linear array.

5. A receiver as recited in claim 1 wherein said sensor array is a planar array.

6. A receiver as recited in claim 1 wherein said means for beamsteering said sensor array in the direction of the mainbeam comprises a plurality of delays, each said delay connected between a said sensor and a said nonlinear oscillator.

7. A receiver as recited in claim 1 wherein said frequency, $\bar{\omega}$, is the average of the natural frequencies for all said nonlinear oscillators.

8. A receiver as recited in claim 1 wherein said plurality of nonlinear oscillators are implemented on an analog VLSI chip.

9. A receiver as recited in claim 1 wherein the mainbeam signal has an approximate wavelength, $\lambda$ and wherein said sensors are spaced apart by a distance of approximately $\lambda/2$.

10. A narrowband beamformer for operation on the output of a sensor array having a plurality of sensors, the sensor array being beamsteered in the direction of a mainbeam signal, each sensor for receiving the mainbeam signal of approximate frequency, $\Omega$, and sidelobe signals of approximate frequency, $\Omega$, said narrowband beamformer comprising:
   a plurality of nonlinear oscillators, one said nonlinear oscillator connected to each sensor, each said nonlinear oscillator coupled to at least one other said nonlinear oscillator to allow each said nonlinear oscillator to create an output having a frequency of approximately, $\Omega$, in response to receipt of the mainbeam signal by the sensor array and to simultaneously allow each said nonlinear oscillator to create an output in a frequency spectrum that is centered on a frequency of approximately, $\bar{\omega}$, in response to receipt of a sidelobe signal by the sensor array;
   a summer connected to each said nonlinear oscillator for receiving and summing said nonlinear oscillator outputs and creating a summer output; and
   a matched filter connected to said summer for receiving said summer output and separating said summer output by frequency to distinguish the mainbeam signal from the sidelobe signals.

11. A narrowband beamformer as recited in claim 10 wherein said frequency, $\bar{\omega}$, is the average of the natural frequencies for all said nonlinear oscillators.

12. A narrowband beamformer as recited in claim 10 wherein said plurality of nonlinear oscillators are implemented on an analog VLSI chip.

13. A narrowband beamformer as recited in claim 10 wherein the plurality of sensors are arranged linearly in the sensor array with a second sensor juxtaposed between a first sensor and a third sensor; and wherein a first said nonlinear oscillator having state vector, $x_1$, is connected to said first sensor, a second said nonlinear oscillator having state vector, $x_2$, is connected to said second sensor, and a third said nonlinear oscillator having state vector, $x_3$, is connected to said third sensor; and wherein said second nonlinear oscillator is coupled to said first nonlinear oscillator and said third nonlinear oscillator according to the following relationship:

$$dx_2/dt = F(x_2) + \kappa(x_3 + x_1 - 2x_2).$$

14. A narrowband beamformer as recited in claim 10 further comprising a plurality of weighting circuits, each said weighting circuit for multiplying each said nonlinear oscillator output by a weighing factor selected for each nonlinear oscillator prior to summation by said summer.

15. A method for beamforming the output of a plurality of beamsteered sensors comprising the steps of:
   setting a critical phase lag, $\Delta\phi_C$;
   providing a plurality of nonlinear oscillators;
   connecting a separate said nonlinear oscillator to each beamsteered sensor;
   coupling each said nonlinear oscillator to at least one other said nonlinear oscillator;
   connecting each said nonlinear oscillator to a summer; and
   adjusting the coupling strength between said coupled oscillators to cause said summer to output a signal having an approximate frequency, $\Omega$, in response to receipt of a signal having an approximate frequency, $\Omega$, by said beamsteered sensors when the phase lag, $\Delta\phi$, between any two beamsteered sensors is less than said critical phase lag, $\Delta\phi_c$, and to output a spectrum of signals centered on an approximate frequency, $\bar{\omega}$, in response to receipt of a signal of frequency, $\Omega$, by said beamsteered sensors when the phase lag, $\Delta\phi$, between any two beamsteered sensors is greater than said critical phase lag, $\Delta\phi_c$.

16. A method as recited in claim 15 further comprising the step of:

separating said summer output into signals having an approximate frequency $\Omega$, and signals centered on an approximate frequency, $\bar{\omega}$.

17. A method as recited in claim 16 wherein said separating step is performed using a matched filter.

18. A method as recited in claim 15 wherein said frequency, $\bar{\omega}$, is the average of the natural frequencies for all said nonlinear oscillators.

* * * * *

UNITED STATES PATENT AND TRADEMARK OFFICE
CERTIFICATE OF CORRECTION

PATENT NO. : 6,473,362 B1
DATED : October 29, 2002
INVENTOR(S) : Michael Gabbay

It is certified that error appears in the above-identified patent and that said Letters Patent is hereby corrected as shown below:

Column 5,
Line 14, delete "$W_{1,2...N}$." insert -- $w_{1,2...N}$. --
Line 32, delete "46°" insert -- 46c --

Column 6,
Line 3, delete "coupled," insert -- coupled --
Line 57, delete "$\Delta\Phi^C$" insert -- $\Delta\varphi_C$ --

Column 7,
Line 6, delete "$\Delta\Phi^C$" insert -- $\Delta\varphi_C$ --

Signed and Sealed this

First Day of April, 2003

JAMES E. ROGAN
*Director of the United States Patent and Trademark Office*